US007084085B2

(12) United States Patent
O'Hare et al.

(10) Patent No.: US 7,084,085 B2
(45) Date of Patent: Aug. 1, 2006

(54) PROCESS FOR REGENERATING A LAYERED DOUBLE HYDROXIDE

(75) Inventors: Dermot Michael O'Hare, Oxford (GB); Andrew Michael Fogg, Manchester (GB); Gordon Michael Parkinson, Rossmoyne (AU)

(73) Assignee: Curtain University of Technology (AU)

( * ) Notice: Subject to any disclaimer, the term of this patent is extended or adjusted under 35 U.S.C. 154(b) by 660 days.

(21) Appl. No.: 10/264,455

(22) Filed: Oct. 4, 2002

(65) Prior Publication Data

US 2003/0064019 A1  Apr. 3, 2003

Related U.S. Application Data

(62) Division of application No. 09/581,356, filed as application No. PCT/GB98/03705 on Aug. 7, 2000, now Pat. No. 6,479,024.

(30) Foreign Application Priority Data

Dec. 11, 1997 (GB) .................................. 9726117.6

(51) Int. Cl.
*B01J 20/00* (2006.01)
*C01D 15/00* (2006.01)
*C01F 7/00* (2006.01)

(52) U.S. Cl. .......................... 502/27; 502/28; 502/414; 423/600

(58) Field of Classification Search .................. 502/22, 502/27, 28, 414; 423/600
See application file for complete search history.

(56) References Cited

U.S. PATENT DOCUMENTS

| | | | |
|---|---|---|---|
| 4,915,930 A | | 4/1990 | Goheen et al. |
| 5,075,089 A | | 12/1991 | Misra et al. |
| 5,075,472 A | | 12/1991 | Misra et al. |
| 5,358,701 A | * | 10/1994 | Pinnavaia et al. ........ 423/242.1 |
| 5,468,701 A | * | 11/1995 | Nebergall et al. ............. 502/80 |
| 5,624,646 A | | 4/1997 | Phillips et al. |
| 5,888,461 A | | 3/1999 | Soirat |

FOREIGN PATENT DOCUMENTS

| | | |
|---|---|---|
| EP | 0327660 | 8/1989 |
| FR | 2736908 | 1/1997 |

OTHER PUBLICATIONS

Miyata, Shigeo, "Anion-Exchange Properties of Hydrotalcite-Like Compounds," Clays and Clay Minerals (1983), vol. 31, No. 4, pp. 305-311.
Habashi, Fathi, "A Hundred Years of the Bayer Process for Alumina Production," Edited by Larry G. Boxall, Light Metals 1988, Proceedings of the technical sessions by the TMS Light Metals Committee at the 117th TMS Annual Meeting, Jan. 25-28, 1988, pp. 3-11.
Narita et al., "Adsorption of Carboxylate Ions By Magnesium-Aluminium Oxide: Formation of Layered Hydrotalcite-Like Compounds," Proceedings of the 9th International Clay Conference Strasbourg, 1989, Sciences Geologiques (1990), No. 86, pp. 145-154.
Misra et al., "Composition And Properties of Synthetic Hydrotalcites," Clays and Clay Minerals (1992), vol. 40, No. 2, pp. 145-150.
Ulibarri et al., "Hydrotalcite-like compounds as potential sorbents of phenols from water," Applied Clay Science (1995), No. 10, pp. 131-145.
Perrotta et al., "Hydrocalumite Formation in Bayer Liquor And Its Promotional Effect on Oxalate Precipitation," Light Metals 1995, Edited by J. Evans, The Minerals, Metals, & Minerals Society (1995), pp. 77-87.
Amin et al., "Humic Substance Uptake By Hydrotalcites and Pilcs," Wat. Res. (1996), vol. 30, No. 2, pp. 299-306.
Perrotta et al., "Layered Double Hydroxides Formation in Bayer Liquor And Its Promotional Effect on Oxalate Precipitation," Light Metals 1996, Edited by Wayne Hale, Edited by J. Evans, The Minerals, Metals, & Minerals Society (1996), pp. 17-28.
Perrotta et al., "Layered Double Hydroxides For Treatment of Bayer Process Lake Water," Light Metals 1997, Edited by J. Evans, The Minerals, Metals, & Minerals Society (1997), pp. 37-48.

* cited by examiner

*Primary Examiner*—Steven Bos
(74) *Attorney, Agent, or Firm*—Volpe and Koenig, P.C.

(57) ABSTRACT

A process for producing alumina from bauxite is described in which bauxite is treated with an alkali to form a mixture comprising a solution of aluminum-containing ions and alumina trihydrate is precipitated from the solution. The process comprises treatment of the solution before or after the precipitation step with a layered double hydroxide in order to remove impurities from the solution by intercalation into the layers in the double hydroxide. The double hydroxide may contain layers of the formula: $[LiAl_2(OH)_6]^+$.

8 Claims, No Drawings

PROCESS FOR REGENERATING A LAYERED DOUBLE HYDROXIDE

CROSS REFERENCE TO RELATED APPLICATIONS

This application is a divisional of U.S. patent application Ser. No. 09/581,356, filed Aug. 7, 2000 now U.S. Pat. No. 6,479,024, which is incorporated by reference as if fully set forth.

PROCESS FOR PRODUCING ALUMINA

This invention relates to a process for producing alumina. In particular, the invention relates to a process for extracting alumina from bauxite.

Aluminium is produced, almost exclusively, from the alumina ore bauxite by a combination of the Bayer and Hall-Heroult processes. In the Bayer process, bauxite is typically crushed, washed, dried and ground before being treated with aqueous sodium hydroxide at an elevated temperature. The sodium hydroxide dissolves the alumina to form a solution from which insoluble impurities ("red muds") are removed. Alumina trihydrate ($Al_2O_3 \cdot 3H_2O$ or $Al(OH)_3$) as gibbsite is precipitated from the solution and is calcined to produce alumina ($Al_2O_3$) for electrolytic reduction to aluminium in the Hall-Heroult process. An outline of the Bayer process is given in *Chemistry and Industry,* 18 Jul. 1988, p. 445–451.

The precipitation of the trihydrate from the solution ("the Bayer process liquor") involves seeding the solution with crystals of the trihydrate (in the form of gibbsite) at about 80° C. and maintaining the temperature at this level for a significant period of time whilst crystallisation takes place. If the trihydrate is precipitated more rapidly, for example at lower temperatures, it is found to be less pure and the impurities which it contains, such as silicates, sulphate, oxalate, carbonate, sodium and organic compounds, make it unsuitable for electrolysis because of the adverse effects which these impurities have on the electrolytic cell and on the resulting aluminium.

An essential feature of the Bayer process is that the liquor stream is recycled; as a consequence, there can be a build up of contaminants, impurities and additives with time. In Bayer liquors containing relatively high levels of oxalate as impurity, this problem is remedied to some extent by crystallising sodium oxalate from the liquor.

The contaminants in the Bayer liquor may be conveniently considered under three separate headings: organic impurities, inorganic impurities and additives.

Organic materials are introduced into the Bayer process by almost all bauxites. Whilst initially much of this is in the form of humic materials, with time in the liquor, degradation occurs and a vast number of organic compounds is generated, with a wide range of molecular weights and chemical structures and functionalities. The largest concentration of any single organic compound is the oxalate anion ($C_2O_4^{2-}$), the penultimate degradation product of the humates present in the liquor prior to the formation of $CO_2/CO_3^{2-}$. Not all of the organic compounds have equal effects on the Bayer process. Many of the organic compounds strongly absorb visible light, turning an otherwise colourless liquor various shades from pale straw to virtually black. The most serious problem associated with many of the organic compounds is the undesirable effects they have on the precipitation of gibbsite and sodium oxalate.

Certain compounds are known to be very strong poisons of gibbsite precipitation. For example, organic molecules containing specific hydroxyl (—OH) and carboxyl (—COOH) groups can dramatically affect gibbsite precipitation. Negative effects of these compounds can include reduction in precipitation rate, precipitation yield, product purity (both colour, and also increased sodium content, which remains in the alumina produced by calcining, and causes problems in subsequent aluminium production), morphology and strength (resistance to attrition) and an increase in the relative amount of smaller particles (fines) in the product.

In all Bayer plants where there is an increasing concentration of oxalate in the liquor stream with time, the sodium oxalate must be removed, because above certain concentrations the liquor becomes unstable with respect to the solubility of sodium oxalate, and the latter can precipitate out spontaneously, causing various problems in plant operation, including flotation and solids overflow, generation of undesired fine particles of gibbsite and contamination of the gibbsite product by co-crystallization with sodium oxalate. The controlled removal of sodium oxalate is usually achieved by controlled precipitation, either in a separate side stream or by deliberate co-crystallization with gibbsite, in a controlled manner, in the main process stream. Alternative removal processes include "liquor burning" and adsorption onto an inert solid phase e.g., activated carbon. Some of the organic compounds in the Bayer liquor, apart from oxalate, can affect the precipitation of sodium oxalate by raising its apparent solubility (and hence lowering the driving force to make it crystallize), thereby reducing yield, as well as precipitation rate, by poisoning sodium oxalate crystal growth sites. The compounds which have a negative effect on the crystallization of sodium oxalate are referred to by the generic term oxalate seed poisons.

Various inorganic anions are introduced into the Bayer liquor during plant operation, some of which build up in concentration, through digestion of the bauxite, from naturally occurring impurities in the bauxite and/or reagents and water, and, in the case of carbonate ($CO_3^{2-}$), also through reaction of atmospheric carbon dioxide with the caustic soda solution. Inorganic anions derived from impurities in bauxite include oxoanions of metals (e.g., oxoanions of transition metals) such as vanadate ($VO_4^{3-}$), ferrate ($FeO_4^{2-}$) and silicate ($SiO_4^{4-}$). Other inorganic anions in the liquor include sulphate ($SO_4^{2-}$) and phosphate ($PO_4^{3-}$), for example.

In the case of some Bayer plants, using certain bauxites as feedstocks, the concentration of sulphate in the liquor can build up to unacceptable levels. The problems caused by the presence of sulphate in the liquor stream include raising the ionic strength of the liquor whilst reducing the effective level of free caustic, and potential problems of scale formation (e.g., by gypsum, $CaSO_4 \cdot 2H_2O$) through reaction with calcium added during causticisation.

During the digestion stage of the Bayer process, soluble silica is taken up into solution in the Bayer liquor, and is subsequently precipitated as de-silication product (DSP), which partially or wholly consists of one or more sodium alumino-silicates. Whilst this precipitation step effectively removes the silicon from solution, it does so at the expense of removing sodium and aluminium from useful production.

The conversion of sodium hydroxide in the Bayer liquor to sodium carbonate greatly reduces the effectiveness and productivity of plant operation, and so is currently treated in many refineries by the process of causticisation, in which quicklime (calcium oxide, CaO) and/or slaked lime (calcium hydroxide, $Ca(OH)_2$) is added to the liquor. In practice, not all of the lime is converted to calcium carbonate, and some reacts to form other compounds, including ones which use up aluminium. The large quantities of lime used, combined with the inefficiencies usually associated with its use, leads to causticisation being a large expense in the operation of a Bayer plant, as well as there being associated negative environmental impacts.

Various chemicals are added to the Bayer liquor at different parts of the process to achieve a range of improvements; for example, crystal growth modifiers and flocculants. It is sometimes advantageous to be able to remove some of these chemicals at certain stages of the process, and yet not remove others.

In view of the huge volume of bauxite which is processed around the world, even small improvements in the process, such as a reduction in the time taken for precipitation or a reduction in the temperature which needs to be maintained, can lead to vast cost savings.

Layered double hydroxides are a class of compounds which comprise two metal ions and have a layered structure. A brief review of layered double hydroxides is provided in *Chemistry in Britain*, September 1997, p. 59 to 62. The hydrotalcites, perhaps the most well-known of the layered double hydroxides, have been studied for many years. Hydrotalcite clays useful as catalysts for hydrocarbon conversion are disclosed in U.S. Pat. No. 5,354,932. It is known that layered double hydroxides can intercalate certain inorganic anionic species, such as carbonate, within the layers in their structure.

The structure of the layered hydroxides $[LiAl_2(OH)_6]X$, where X is Cl, Br or $NO_3$, and their monohydrates, has been described by Besserguenev et al., in *Chem. Mater,* 1997, no. 9, p. 241–247. The hydroxides can be produced by the reaction of gibbsite [$\gamma$—$Al(OH)_3$] or other forms of $Al(OH)_3$, such as bayerite, nordstrandite or doyleite, with lithium salts of formula LiX. The materials can also be formed in other ways, such as by direct precipitation (see, for example, Serna et al, *Clays & Clay Minerals*, (1997), 25,384). The structure of the $LiAl_2(OH)_6^+$ layers in the compounds is unusual for a layered double hydroxide since it is based on an ordered arrangement of metal cations. The preparation of these compounds is also described in U.S. Pat. No. 4,348,295 and U.S. Pat. No. 4,348,297. A few other layered double hydroxides having cation ordering are known, such as the compounds containing layers of formula $[Ca_2Al(OH)_6]^+$.

Perrotta et al, Light Metals, 1996, pages 17 to 28 and Light Metals, 1995, page 77 describe layered double hydroxide formation in Bayer liquor and its promotional effect on oxalate precipitation. The layered double hydroxide is formed only in situ by the addition of calcium or magnesium hydroxide to the Bayer liquor and can reduce its oxalate content. Also, the same in situ layered double hydroxide formation is described as enhancing oxalate precipitation from spent liquor. Since the layered double hydroxide is formed in situ in the Bayer liquor, with the dissolved alumina in the liquor providing a component of the reaction in which the layered double hydroxide is formed, the liquor is not itself treated with a layered double hydroxide. The chemistry behind the process is not described in detail by Perrotta et al but there are indications that intercalation plays at most a minor role. A further application of the same concept is described in Perotta et al, Light Metals, 1997, 37 which involves the treatment of Bayer lake water. The technology taught by Perrotta et al requires the use of relatively large amounts of lime or magnesia which, generally, is not recycled and leads to the removal of aluminate ions from the liquor (to form the layered double hydroxide) which is clearly undesirable. Also, it has the disadvantage of potentially introducing unwanted substances into the Bayer liquor; it is known, for example, that calcium ions have an adverse effect on the precipitation of gibbsite (see Cornell et al, Fourth International Alumina Quality Workshop, 2–7 Jun. 1996, pages 97-). Furthermore, calcium leads to the formation of $CaSO_4.2H_2O$ and other scale-forming compounds.

WO 97/03924 describes a method for purifying sodium aluminate solutions containing sodium oxalate (e.g., Bayer process liquors) in which the sodium oxalate is precipitated using tricalcium aluminate hexahydrate. The tricalcium aluminate hexahydrate acts as an initiator for precipitation and is not described as having any effect on the other impurities in the liquor.

The present invention aims to alleviate or solve the problems associated with the presence of impurities in Bayer process liquors. The solution to the problem involves the use of layered double hydroxides.

Accordingly, the present invention provides a process for producing alumina from bauxite which comprises treating bauxite with an alkali to form a mixture comprising a solution of aluminium-containing ions and precipitating alumina trihydrate from the solution, characterised in that the process comprises treating the solution before or after the precipitation step with a layered double hydroxide in order to remove impurities from the solution by intercalation into the layers in the double hydroxide. The impurities may be removed from the solution either partly or substantially completely.

The term "bauxite" as used herein is intended to cover all alumina-containing ores from which alumina trihydrate (e.g., gibbsite) may be obtained.

Anionic impurities present in the solution, which may be removed in the process of the invention, typically include carbonate, sulphate, oxalate (derived from organics in or associated with the bauxite ore), humates, phosphates, silicates and transition metal oxoanions and it is preferably, but not necessarily exclusively, one or more of these species which are removed from the solution, either partially or completely, by intercalation into the double hydroxide. The process of the invention is particularly effective in removing carbonate and/or oxalate ions from the solution. Specific advantages of employing the direct removal of oxalate from Bayer liquors include the fact that the concentration of sodium oxalate in solution in any part of the Bayer plant can be kept below the equilibrium solubility value, and hence any and all unwanted precipitations of sodium oxalate can be prevented.

The present invention can also remove the anionic organic compounds that act as oxalate seed poisons, thereby improving the rate and yield of sodium oxalate precipitation from Bayer liquors, and also removing the danger inherent in operating a Bayer plant in an unstable region with respect to sodium oxalate precipitation, when the crystallization driving force is delicately balanced, and slight changes in the composition of the organic compounds in the Bayer liquor (due to, for example, a change in source of bauxite) can lead to unexpected and unwanted precipitation of sodium oxalate.

The present invention has advantages over the use of other agents for removing impurities from Bayer liquor because of the selectivity of the layered double hydroxides. It can leave in solution aluminate ions as well as the beneficial additives, such as cationic organic species and high molecular weight flocculant molecules. Thus, the additional costs associated with the non-selective removal agents, such as activated carbon, on account of their tendency to remove additives, can be avoided. Furthermore, the ordered arrangement of cations in layered double hydroxides such as those containing layers of formula $LiAl_2(OH)_6^+$ provides selectivity for different anions and this can be advantageous since it may be possible to select for removal from the liquor only those anions which have a deleterious effect on the process.

The invention is at least partly based on the recognition that some anionic impurities may slow the rate of precipitation of the alumina trihydrate by intercalating into the layers in the trihydrate and/or adsorbing on crystal growth surfaces and blocking active growth sites as the trihydrate crystallises out of the solution. Furthermore, anionic impurities can exhibit other undesirable effects; for example, sulphate ions can act as templates for the crystallisation of zeolites which coprecipitate with the trihydrate and cause problems downstream in the aluminium production process. Oxalate ions play various roles in deleteriously affecting the process and may be considered to constitute the most important impurity. Other impurities present in the solution, such as organic molecules and ions (e.g. humates) may also be removed in the process of the invention.

The process of the invention is preferably based on the conventional Bayer process. The process of the invention is also able to reduce the colour of the conventional Bayer liquor, as formed, by removal of impurities. The layered double hydroxide may be used to treat the Bayer liquor before gibbsite precipitation or after gibbsite precipitation (i.e., by treatment of the green (pregnant) and/or spent liquors) or at both stages of the process. Treatment of the spent liquor reduces the impurities which are recycled with the liquor to the start of the process. Treatment of the spent liquor may be carried out in addition to a conventional step of precipitating oxalate from the liquor.

The process of the invention is applicable in areas other than the Bayer process. Therefore, in another embodiment, the present invention provides a method of producing an aluminium oxide or hydroxide which comprises the precipitation of the oxide or hydroxide from an alkaline solution containing aluminate ions, wherein the method comprises the step of treating the solution with a layered double hydroxide in order to remove impurities from the solution by intercalation into the layers in the double hydroxide. The aluminium oxide or hydroxide produced in this way may be of high purity for speciality use.

The process of the invention is particularly effective in decolourising Bayer liquor to less coloured or colourless solutions. Therefore, another embodiment of the invention is a process for decolourising alkaline solutions containing aluminate anions in the Bayer process which comprises treating the solution with a layered double hydroxide. The decolourisation may be due to the removal of coloured organic anions and/or transition metal oxoanions from the solution.

The layered double hydroxide may be any compound which is able to remove some, or all, of the anionic impurities from the solution. The layered double hydroxide preferably contains aluminium as one of the metal cations in the compound and the other metal cation is preferably ordered within the structure of the compound. A preferred compound comprises layers of formula $[LiAl_2(OH)_6]^+$, such as $[LiAl_2(OH)_6]OH$, optionally hydrated. $[LiAl_2(OH)_6]OH$ may either be used as such or as a compound of formula $[LiAl_2(OH)_6]A$, optionally hydrated, wherein A is a monovalent counterion other than OH such as fluoro, chloro, bromo or nitro, which is converted to $[LiAl_2(OH)_6]OH$ in situ in the alkaline solution containing the dissolved alumina. However, the use of $[LiAl_2(OH)_6]OH$ is preferred since it releases only hydroxide ions into the liquor when an impurity is intercalated into the layers in the compound. Thus, $[LiAl_2(OH)_6]OH$ can act to recausticise the liquor by removing anions such as carbonate and replacing them by hydroxide. Compounds containing $[LiAl_2(OH)_6]^+$ layers are particularly advantageous since they can be readily produced from the alumina trihydrate (gibbsite) which is precipitated in the Bayer process and one of the starting materials for its production is therefore already available to bauxite processors in large quantities. Also, the use of this alumina-based compound ensures that any leaching of the compound has little or no contaminating effect on the solution. The $[LiAl_2(OH)_6]^+$ layered compounds are stable at high temperature (above 300° C.) and, as mentioned above, can exhibit selectivity for certain anions.

The double hydroxide may be regenerated at the end of the process. A first preferred method of regeneration comprises treatment with carbonate to form a carbonate intercalate, thereby displacing the anionic impurities other than carbonate from the layers in the structure, calcining the carbonate intercalate and hydrating the resulting product. Treatment with carbonate in this regeneration process may involve subjecting the double layered hydroxide to an aqueous solution of a soluble carbonate salt, such as sodium carbonate, at about or above room temperature for up to several hours (e.g., at 20 to 100° C. for from 1 to 48 hours). A second preferred method of regeneration involves treatment of the layered double hydroxide, optionally after displacement of the anionic impurities other than carbonate with carbonate (as described for the first preferred method), with an acid under conditions which cause protonation and de-intercalation of the intercalated ions whilst leaving the layers of the layered double hydroxide substantially intact. Suitable conditions involve treatment of the layered double hydroxide with dilute acid (e.g., dilute hydrochloric acid) at room temperature. Regeneration can also be carried out by other methods, however, such as treatment of the double hydroxide with LiCl solution when $[LiAl_2(OH)_6]^+$ compounds are employed.

In accordance with the conventional conditions of the Bayer process, the solution is preferably treated with the double hydroxide when the solution is at an elevated temperature (e.g., of about 80 to 100° C.), preferably by treatment of the spent liquor i.e., after the liquor has been seeded with alumina trihydrate crystals for precipitation. The double hydroxide may be used as such or on a support (e.g., of resin beads). Treatment of the solution with the double hydroxide may involve any method of bringing the two materials together without harmful contamination of the solution such as, for example, passing the solution through the double hydroxide using techniques well-known in filtration and separation science. For example, treatment could take the form of a batch reaction or could involve flow of the liquor through a bed of the layered double hydroxide.

Passing the solution through a body of the double hydroxide allows use to be made of the different intercalation properties of double hydroxides having different guest anions. Thus, for example, it is possible to employ a body comprising a region of formula $[LiAl_2(OH)_6]OH$ and downstream of said region (i.e., in the direction of flow of the solution), at least one other region of formula $[LiAl_2(OH)_6]Y$, wherein Y is an anion other than OH— whose presence in the solution is beneficial to the process, such that Y— ions pass into the solution on intercalation of the impurities into the layers in the double hydroxide. In this way, beneficial anions can be added to the solution in precise amounts.

Similarly, it is possible to use, for example, a body of layered double hydroxide comprising a region of formula [LiAl$_2$(OH)$_6$]OH and, downstream of said region, at least one other region of formula [LiAl$_2$(OH)$_6$]Y', wherein Y' is an anion which intercalates less strongly into the [LiAl$_2$(OH)$_6$]$^+$layers than OH—, in order that the region of formula [LiAl$_2$(OH)$_6$]Y' may intercalate any impurities which have not already been intercalated into the region of formula [LiAl$_2$(OH)$_6$]OH. Y and Y' may be the same or different.

In another embodiment, the invention provides the use of a layered double hydroxide, such as [LiAl$_2$(OH)$_6$]OH optionally hydrated for example, in the removal of anionic impurities from Bayer process liquors.

The advantages of the present invention include the following:

the layered double hydroxides are readily able to withstand the high pH of the alkaline solutions used to dissolve the alumina;

the double hydroxides may be regenerated;

the double hydroxides can be readily produced from a material which is already available to bauxite processors in large quantities;

the double hydroxides can selectively remove unwanted impurities;

the double hydroxides can recausticise the liquor by exchanging hydroxide ions (OH—) for other ions in the liquor on intercalation;

the intercalation process is very fast at room temperature and above and so large volumes of solution can be treated quickly;

the need for lime or magnesia is avoided and thus so is the detrimental affect of calcium on the precipitation of gibbsite;

the organic and inorganic compounds responsible for the colour of Bayer liquor can be effectively removed;

separation of the unwanted impurities from the solution is obtained quickly without any substantial effect on the aluminate ions contained in the solution and without requiring any significant modification of the conventional Bayer process;

alumina (e.g., gibbsite) growth rates, yield, agglomeration behaviour, morphology, particle size distribution, purity and strength can be improved; and the use of compounds based on Al(OH)$_3$, such as [LiAl$_2$(OH)$_6$]OH.H$_2$O ensures that the double hydroxide cannot contaminate the solution.

The invention will now be illustrated by reference to the following non-limiting examples.

EXAMPLES

Example 1

Synthesis of [LiAl$_2$(OH)$_6$]X.nH$_2$O(n≈1)

Al(OH)$_3$+LiX→[LiAl$_2$(OH)$_6$]X.nH$_2$O

X=Cl—, Br—, OH—, NO$_3$—; (n≈1)

Conditions: Gibbsite was stirred with at least a threefold molar excess of LiX in water (0.1M) at 90° C. for 6 hours.

Example 2

Intercalation of Anions into [LiAl$_2$(OH)$_6$]X.nH$_2$O

2[LiAl$_2$(OH)$_6$]Cl.nH$_2$O+Na$_2$C$_2$O$_4$→[LiAl$_2$(OH)$_6$]$_2$C$_2$O$_4$.nH$_2$O+2NaCl

2[LiAl$_2$(OH)$_6$]OH.nH$_2$O+Na$_2$SO$_4$→[LiAl$_2$(OH)$_6$]$_2$SO$_4$.nH$_2$O+2NaOH

The above examples are typical reactions of this system and will occur for most inorganic and organic anions.

Conditions: 250 mg [LiAl$_2$(OH)$_6$]Cl.nH$_2$O suspended in a 0.1M aqueous solution of the required guest (threefold molar excess) and stirred at room temperature overnight. Most reactions will actually occur in a few seconds.

Example 3

Exchange with Carbonate

[LiAl$_2$(OH)$_6$]$_2$SO$_4$.nH$_2$O+Na$_2$CO$_3$→[LiAl$_2$(OH)$_6$]$_2$CO$_3$.nH$_2$O+Na$_2$SO$_4$

Conditions: 250 mg [LiAl$_2$(OH)$_6$]$_2$[X].nH$_2$O (X=dianion) suspended in an aqueous solution of Na$_2$CO$_3$ (0.1M) and heated at 80° C. for 24 hours.

Example 4

Reformation of [LiAl$_2$(OH)$_6$]OH.nH$_2$O $$[LiAl_2(OH)_6]_2CO_3 \cdot nH_2O \xrightarrow{400°\ C.\ NaOH(aq)} \text{"}[LiAl_2(OH)_6]_2O\text{"} \longrightarrow [LiAl_2(OH)_6]OH \cdot nH_2O$$

Conditions: Calcine the carbonate intercalate at 400° C. then suspend in aqueous sodium hydroxide overnight at room temperature.

This demonstrates the viability of a cyclic process for the removal of carbonate from Bayer liquor in which the layered double hydroxide is recycled using the reformation procedure outlined above.

Example 5

Regeneration of [LiAl$_2$(OH)$_6$]Cl.H$_2$O from [LiAl$_2$(OH)$_6$]$_2$[CO$_3$].nH$_2$O Using Dilute Acid 150 mg of [LiAl$_2$(OH)$_6$]$_2$[CO$_3$].nH$_2$O was suspended in 10 ml of 1.0M HCl in ethanol and stirred at room temperature overnight. X-ray diffraction of the resulting compound showed that it was [LiAl$_2$(OH)$_6$]Cl.H$_2$O though some decomposition to gibbsite had occurred. Elemental analysis confirmed that Cl had exchanged for CO$_3^{2-}$. The chloride intercalate [LiAl$_2$(OH)$_6$]Cl.H$_2$O can be rapidly converted to the hydroxide intercalate [LiAl$_2$(OH)$_6$]OH.nH$_2$O at room temperature by treatment with excess sodium hydroxide solution.

Example 6

Uptake of Carbonate from Alkaline Solution by $[LiAl_2(OH)_6]Cl.H_2O$

Conditions: 0.5 g $[LiAl_2(OH)_6]Cl.nH_2O$ suspended at room temperature for 24 hours in 10 ml of an aqueous solution containing:
i) 1:1 molar ratio (1M:1M) of $NaOH:Na_2CO_3$
ii) 2:1 molar ratio (2M:1M) of $NaOH:Na_2CO_3$
iii) 1:2 molar ratio (1M:2M) of $NaOH:Na_2CO_3$ The two possible products cannot be distinguished by X-ray diffraction so elemental analysis for carbon was used. Results showed that in all cases the carbon content was approximately 75% of the value obtained for $[LiAl_2(OH)_6]_2CO_3.nH_2O$.

This example illustrates the principle of removing carbonate anions from a highly alkaline solution and therefore demonstrates the applicability of the technique to the removal of carbonate (and other) anions from alkaline Bayer process liquors.

Example 7

Treatment of Bayer Liquor

Reactions were carried out using a chromatography column created from the layered double hydroxide $[LiAl_2(OH)_6]OH.nH_2O$. Aliquots of spent Bayer liquor were passed down the column before it was broken into sections for analysis by XRD and elemental analysis. The XRD patterns for all the sections showed the interlayer separation characteristic of the carbonate intercalate and there was a significant amount of carbon in the elemental analysis (corresponding to between 40 and 70% of the carbon content of the pure carbonate intercalate). Analysis of the spent liquor before and after the column experiments indicated that the column had removed carbonate from the liquor as the total carbon content of the liquor had been reduced by 41%.

In this example, the colour of the Bayer liquor was transformed from brown before treatment to a pale yellow colour after treatment by passage through the column. This visual observation was confirmed by the UV/visible spectra obtained for the liquor before and after treatment. Thus, the layered double hydroxide successfully removes the relatively small quantities of impurities which are responsible for the colour of the liquor, such as some organic molecules/ions and transition metal oxoanions. The low amounts of these species means that their intercalation cannot be detected on the basis of ordered intercalate phases in the XRD pattern.

Example 8

Intercalation of Organic Ions

Guests were obtained as either disodium or dipotassium salts. Those not available as salts were made by reacting the acid with a two to three fold molar excess of ethanolic NaOH, leading to the precipitation of the disodium salt.

Anion exchange was accomplished by reacting the disodium or dipotassium salt of the following dicarboxylic acids, as models for the type of organic dianions found in humates, in a three-fold molar excess with a suspension of $[LiAl_2(OH)_6]Cl.H_2O$ in $H_2O$: oxalic, malonic, succinic, adipic, suberic, sebacic, fumaric, maleic, phthalic, isophthalic, terephthalic and L-malic. Typically 150 mg of $[LiAl_2(OH)_6]Cl.H_2O$ was reacted with a 5 ml aqueous solution of the required guest in a Young's ampoule at room temperature overnight. The solution was then filtered, washed with de-ionised water and ethanol and left to dry in air. The intercalates were subsequently characterised by XRD, TGA and elemental analysis. The characterising data are summarised in Table 1. The suberate, sebacate and isophthalate intercalates collapse on drying so XRD patterns of these compounds were recorded on a wet sample.

TABLE 1

| A | Stoichiometry | Interlayer Spacing (Å) | Elemental Analysis (%) Observed | Calculated |
|---|---|---|---|---|
| Oxalate | $[LiAl_2(OH)_6]_2[C_2O_4].4H_2O$ | 8.2 | C 4.92, H 4.34 Li 2.39 Al 21.76 | C 4.94, H 4.15 Li 2.86 Al 22.21 |
| Malonate | $[LiAl_2(OH)_6]_2[C_3H_2O_4].4H_2O$ | 10.5 | C 7.13, H 4.65 | C 7.21, H 4.43 |
| Succinate | $[LiAl_2(OH)_6]_2[C_4H_4O_4].8H_2O$ | 12.1 | C 8.44, H 5.25 Li 2.39 Al 17.77 | C 8.20, H 5.50 Li 2.37 Al 18.41 |
| Adipate | $[LiAl_2(OH)_6]_2[C_6H_8O_4].8H_2O$ | 14.2 | C 12.06 H 5.48 Li 2.32 Al 16.24 | C 12.47 H 5.58 Li 2.26 Al 17.57 |
| Suberate | $[LiAl_2(OH)_6]_2[C_8H_{12}O_4].6H_2O$ | 16.6# | C 15.57, H 5.86 | C 15.85, H 5.99 |
| Sebacate | $[LiAl_2(OH)_6]_2[C_{10}H_{16}O_4].5H_2O$ | 18.8‡ | C 19.27, H 6.19 | C 19.49, H 6.22 |
| Terephthalate | $[LiAl_2(OH)_6]_2[C_8H_4O_4].5H_2O$ | 14.2 | C 15.49, H 4.51 Al 16.94 Li 2.18 | C 16.31, H 4.62 Al 18.32 Li 2.36 |
| Isophthalate | $[LiAl_2(OH)_6]_2[C_8H_4O_4].4H_2O$ | 15.1 | C 15.54, H 4.40 | C 16.83, H 4.41 |
| Phthalate | $[LiAl_2(OH)_6]_2[C_8H_4O_4].4H_2O$ | 15.0† | C 16.97, H 4.80 | C 16.83, H 4.41 |
| Fumarate | $[LiAl_2(OH)_6]_2[C_4H_2O_4].4H_2O$ | 12.2 | C 9.90, H 3.94 | C 10.01, H 4.62 |

TABLE 1-continued

| A | Stoichiometry | Interlayer Spacing (Å) | Elemental Analysis (%) Observed | Elemental Analysis (%) Calculated |
|---|---|---|---|---|
| Maleate | $[LiAl_2(OH)_6]_2[C_4H_2O_4].4H_2O$ | 12.9 | C 9.26, H 3.30 | C 10.01, H 4.62 |
| L-Malate | $[LiAl_2(OH)_6]_2[C_4H_4O_5].7H_2O$ | 12.1 | C 8.50, H 4.01<br>Al 20.11<br>Li 2.53 | C 8.77, H 4.78<br>Al 19.69<br>Li 2.53 |

Collapses to a 15.6Å phase on drying.
‡Collapses to a 14.8Å phase on drying.
†Collapses to an 11.8Å phase on drying.

Example 9

Intercalation of Perrhenate into a Lithium/Aluminium Layered Double Hydroxide Host The $[LiAl_2(OH)_6]Cl.nH_2O$ host and $NaReO_4$ guest, as a model for the transition metal oxoanions found in Bayer liquor, were weighed out in 1:3 molar proportions corresponding to 150 mg of host and 546 mg of guest. These were then added to an ampoule followed by 5 ml of $H_2O$ as solvent and a stirrer bar. The contents of the ampoule were then stirred at 20° C. for approximately 48 hours. The ampoule was allowed to cool and the solution was filtered through a sintered glass frit.

X-ray diffraction and micro-analysis were performed on the solid sample. Both indicated that intercalation had occurred. X-ray diffraction showed an expanded d-spacing of 9.6Å, and micro-analysis showed that complete intercalation was occurring, giving a product of emprical formula $[LiAl_2(OH)_6]ReO_4.H_2O$.

100 g of $[LiAl_2(OH)_6]Cl.nH_2O$ host would react with 121 g of $NaReO_4$. 100 g of $[LiAl_2(OH)_6]OH.nH_2O$ host would react with 131 g of $NaReO_4$.

The invention claimed is:

1. A process for regenerating a layered double hydroxide which contains an anionic impurity intercalated into the layers in the layered double hydroxide which process comprises treating the layered double hydroxide with an acid under conditions which cause protonation and de-intercalation of the intercalated anionic impurity.

2. A process according to claim 1, wherein the layered double hydroxide contains aluminum cations and alai contains other metal cations which are ordered within the structure of the layered double hydroxide.

3. A process according to claim 2, wherein the layered double hydroxide comprises layers of formula $[LiAl2(OH)6]+$.

4. A process according to claim 1, wherein the anionic impurity is an anion selected from the group consisting of sulphate, carbonate, oxalate, silicates, phosphate, vanadate, ferrate and mixtures of two or more thereof.

5. A process according to claim 4, wherein the anionic impurity is an anion selected from the group consisting of carbonate, oxalate and a mixture thereof.

6. A process according to claim 1, wherein the anionic impurity is selected from the group consisting of transition metal-based oxoanions and organic anions.

7. A process according to claim 1, wherein the layered double hydroxide contains an anionic impurity other than carbonate anions and wherein, before treating with an acid, the layered double hydroxide is treated with a carbonate thereby displacing the anionic impurity from the layers in the layered double hydroxide with carbonate anions to form a carbonate intercalate.

8. A process according to claim 1, wherein the regenerated layered double hydroxide removes anionic impurities from Bayer process liquor.

* * * * *